United States Patent
Mizuno et al.

(10) Patent No.: US 7,213,834 B2
(45) Date of Patent: May 8, 2007

(54) KNEE-PROTECTING AIRBAG DEVICE

(75) Inventors: Yoshio Mizuno, Aichi (JP); Hiromi Yabusaki, Toyota (JP); Yoshikazu Ohno, Toyota (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 377 days.

(21) Appl. No.: 10/839,795

(22) Filed: May 6, 2004

(65) Prior Publication Data

US 2004/0262896 A1    Dec. 30, 2004

(30) Foreign Application Priority Data

May 22, 2003    (JP)    ............................. 2003-145348

(51) Int. Cl.
    *B60R 21/016*    (2006.01)
(52) U.S. Cl. ................. 280/730.1; 280/732; 280/743.1
(58) Field of Classification Search ................ 280/729, 280/730.1, 732, 743.1, 750
    See application file for complete search history.

(56) References Cited

U.S. PATENT DOCUMENTS

2004/0207183 A1 * 10/2004 Nagata et al. ........... 280/730.1
2005/0151352 A1 * 7/2005 Abe et al. ................ 280/730.1
2006/0071459 A1 * 4/2006 Hayakawa et al. ...... 280/730.1

FOREIGN PATENT DOCUMENTS

EP    WO 02/04261 A1    1/2002

* cited by examiner

*Primary Examiner*—Faye M. Fleming
*Assistant Examiner*—Timothy Wilhelm
(74) *Attorney, Agent, or Firm*—Posz Law Group, PLC

(57) ABSTRACT

An airbag of the knee-protecting airbag device according to the present invention includes a cover area which covers the lower side or the back side of key accessories and is contactable with the accessories. The airbag includes a bag-shaped airbag body with a driver's side wall and a column side wall, a protecting cloth, and a retainer cloth. The protecting cloth is joined at its lower end to an area in the column side wall below the cover area, while leaving its upper end as free end. The retainer cloth is so joined at its lower end to the driver's side wall as to be capable of covering the upper end part of the protecting cloth as extended to the driver's side wall. The airbag is transversely folded and housed in the housing in a condition that the upper end part of the protecting cloth is extended to the driver's side wall and then the retainer cloth is superposed thereon.

6 Claims, 14 Drawing Sheets

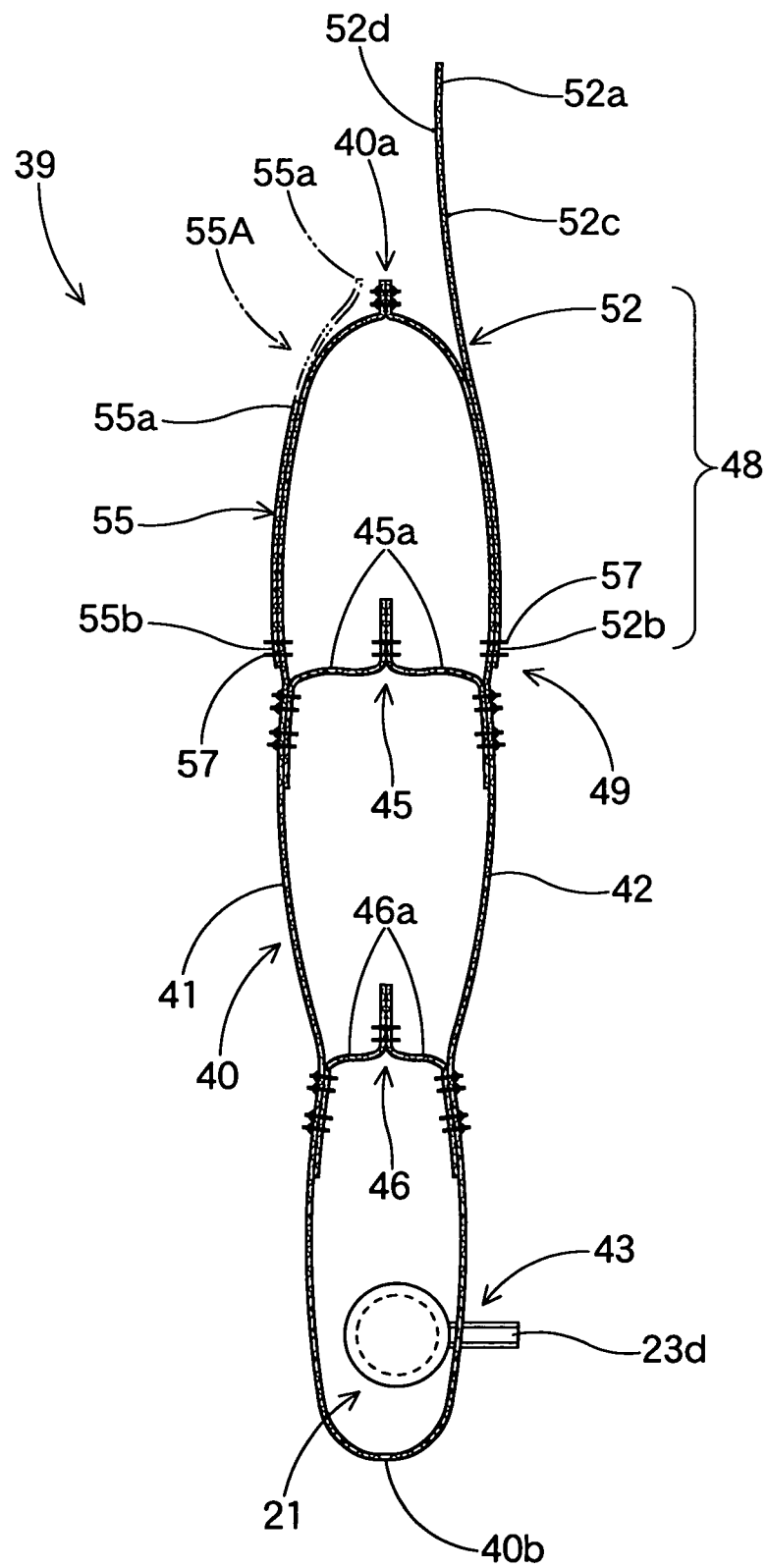

Fig. 7A
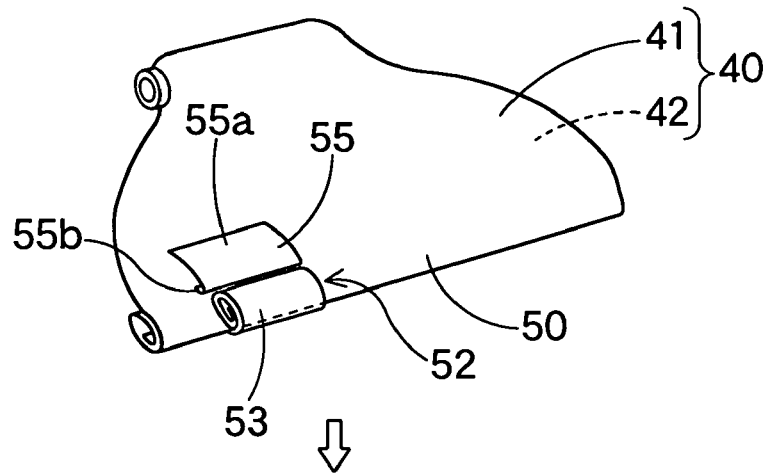
Fig. 7B
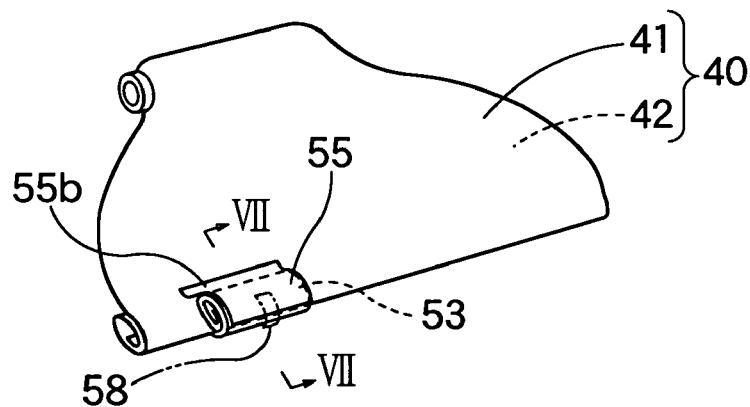
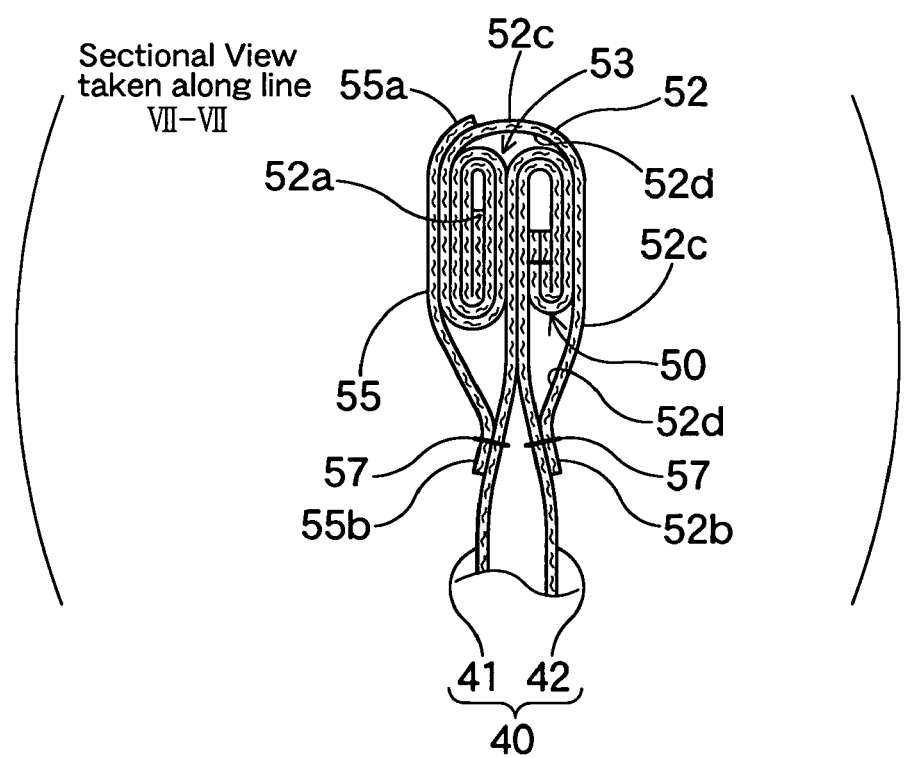
Sectional View taken along line VII-VII Fig. 14A
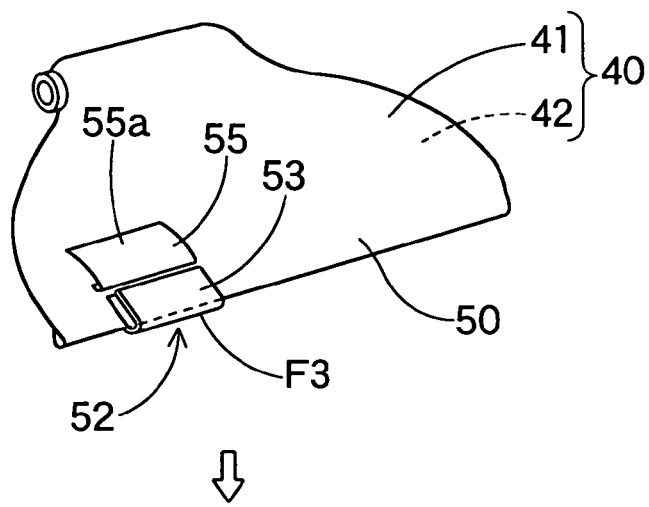
Fig. 14B
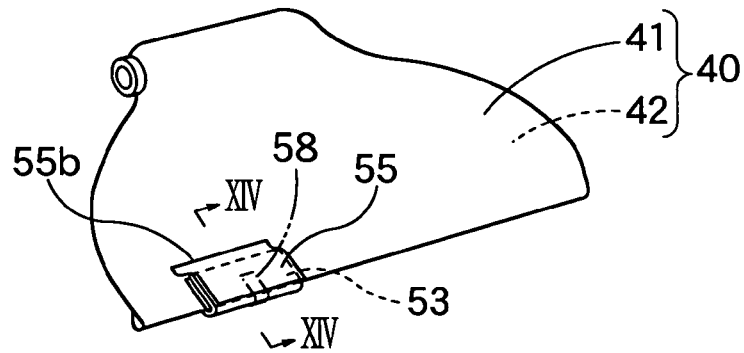
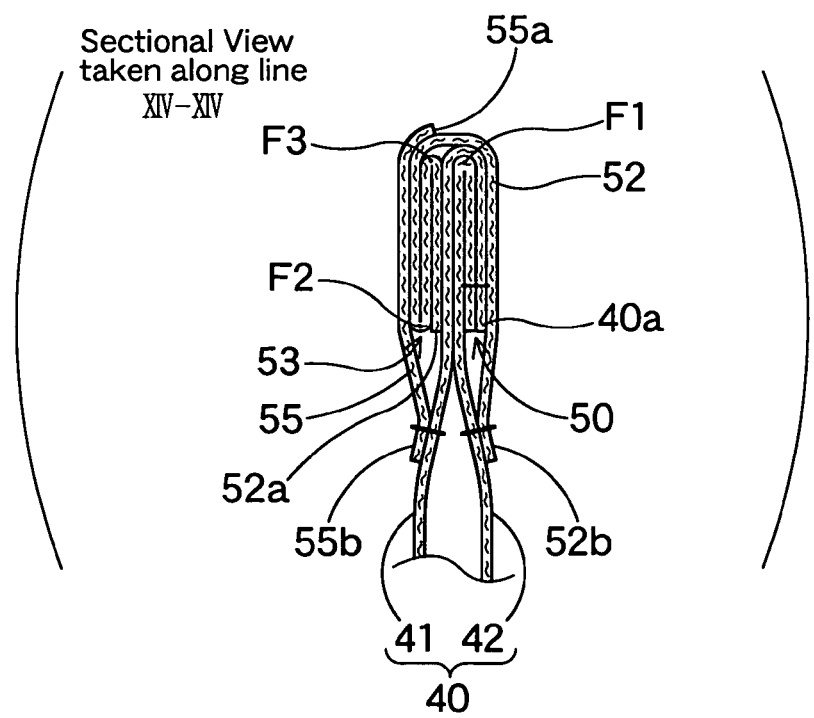
Sectional View taken along line XIV-XIV

KNEE-PROTECTING AIRBAG DEVICE

The present application claims priority from Japanese Patent Application No. 2003-145348 of Mizuno et al., filed on May 22, 2003, the entirety of which is hereby incorporated into the present application by reference.

BACKGROUND OF THE INVENTION

1. Field of the Invention

The present invention relates to a knee-protecting airbag device which protects knees of a driver by an airbag expanding and inflating with inflation gas.

2. Description of the Related Art

In a conventional knee-protecting airbag device for protecting knees of a driver disclosed in WO 02/04261 A1, for example, a folded airbag is housed in and held by a housing located in front of the driver. Upon inflow of inflation gas, the airbag rises along the lower surface of a steering column, and deploys for protecting driver's knees. The airbag as completely deployed is provided, in the vicinity of left or right corner in its upper edge, with a cover area for covering the lower side or back side of key accessories of a key inserted in the key cylinder and touching the accessories.

However, since there are various kinds of key accessories such as a spare key, the lower ends of the accessories may contact an inflated part of the airbag and damage the airbag, when the airbag deploys.

SUMMARY OF THE INVENTION

The present invention contemplates to solve the above mentioned problem, and therefore, has an object to provide a knee-protecting airbag device capable of protecting the airbag and deploying the airbag smoothly in the event that the inflating airbag contacts with accessories connected with a car key.

The object of the present invention is attained by a knee-protecting airbag device having the following construction:

The knee-protecting airbag device includes an airbag, the airbag is folded and housed in a housing located below a steering column in front of a driver, and upon inflow of inflation gas, the airbag protrudes rearward from the housing to deploy upward for protecting knees of the driver, an upper edge portion of the airbag as completely deployed serves as a cover area for covering the lower side or back side of key accessories of a key inserted into a key cylinder and contactable with the accessories, the airbag is roll-folded on a steering column side when the airbag is transversely folded to bring its upper edge close to its lower edge side, the airbag includes:

a bag-shaped airbag body including a driver's side wall and a column side wall, each of the walls being located toward the driver and the column cover, respectively, upon airbag deployment;

a protecting cloth joined to the column side wall for covering the cover area in the column side wall; and a retainer cloth, the protecting cloth is joined at its lower end to an area in the column side wall below the cover area while leaving its upper end as free end, the length of the protecting cloth is predetermined such that the protecting cloth extends over the upper edge of the airbag body when flatly expanded, the retainer cloth is joined at its lower end to an area in the driver's side wall below the cover area for covering an upper end part of the protecting cloth extended to the driver's side wall side, and the airbag is transversely folded and housed in the housing in a condition that the upper end part of the protecting cloth is extended to the driver's side wall side, and the retainer cloth is superposed over the upper end part of the protecting cloth.

When the knee-protecting airbag device of the present invention is actuated, the airbag fed with inflation gas protrudes rearward from the housing, and expands while going up. While the airbag unfolds its roll-folding in the transverse folding, the protecting cloth also unfolds together with the upper edge of the airbag body. Since the upper end of the protecting cloth is a free end, the upper end is released from the retainer cloth and rises in advance of the upper end (upper edge) of the airbag body, so that the protecting cloth covers key accessories from the lower side to the back side, and may further wrap the accessories.

Accordingly, even when the airbag body approaches the key accessories thereafter, the airbag body is able to complete deployment smoothly, since the protecting cloth is interposed between the airbag body and accessories, and protects the airbag body.

Moreover, when the airbag unrolls, the upper end or the free end side of the protecting cloth is covered by the retainer cloth. Accordingly, although the airbag deploys in a narrow space between a driver and a vehicle member located toward the column cover, the retainer cloth does not make the free end side of the protecting cloth contact with the column cover member until the retainer cloth stops contacting with the column cover member. That is, the free end side of the protecting cloth is not turned over until right before the upper edge of the airbag body completes unrolling. After the retainer cloth stops contacting with the member of the column cover, the free end of the retainer cloth becomes openable, and the free end side of the protecting cloth opens the retainer cloth, and springs up due to inertia force of unrolling of the airbag body for covering the lower side or back side of key accessories.

If the airbag body is not provided with the retainer cloth while including the protecting cloth, when the airbag body deploys in a narrow space between a driver and a member of the column cover, the free end side of the protecting cloth may be made immobile due to friction with the column cover member. Then the protecting cloth may not be able to spring up prior to the airbag body, and therefore, may not be able to cover the lower side or the back side of key accessories.

In the knee-protecting airbag device of the present invention, therefore, the airbag body is able to complete deployment and protect the knees of driver securely since the airbag body is protected by the protecting cloth, even if the deploying airbag contacts with accessories connected to a key. Especially, even if the airbag deploys in a narrow space between a driver and a member of the column cover, the protecting cloth is able to cover the lower side or the back side of the key accessories securely, which enables the completely deployed airbag body to protect the knees of the driver securely.

In this case, it is desired that an upper edge portion of the airbag body is transversely folded up to the vicinity of a joint position of the retainer cloth to the driver's side wall, while the upper end part of the protecting cloth is folded toward the lower end of the protecting cloth, and that the folded upper end part of the protecting cloth is then put on the folded upper edge portion of the airbag body, and then the retainer cloth is superposed on the upper end part of the protecting cloth, before completing the transverse folding of the airbag.

With this arrangement, when the airbag body unrolls, the folded upper end part of the protecting cloth put on the upper edge portion of the airbag body is easily sprung up by the upper edge portion of the airbag body. Consequently, the protecting cloth is able to cover the back side of key accessories in a wide area up to the upper side, and the contact of the airbag body with key accessories is further prevented.

In the above case, moreover, it is desired that the upper end part of the protecting cloth is roll-folded toward the airbag body in a condition that the protecting cloth is flatly expanded together with the airbag body, when folded toward the lower end of the protecting cloth, and then is put on the folded upper edge portion of the airbag body. With this arrangement, even if the folded upper end part of the protecting cloth contacts with key accessories when sprung up and unrolling along with the unfolding of the upper edge portion of the airbag body, the upper end part of the protecting cloth is able to unroll smoothly while contacting with accessories, so that the protecting cloth is able to cover the back side of key accessories securely.

It will also be appreciated that the upper end part of the protecting cloth is roll-folded in a direction away from the airbag body when folded toward the lower end of the protecting cloth. Alternatively, moreover, the upper end part of the protecting cloth may be folded in a bellows fashion when folded toward the lower end of the protecting cloth.

It will also be appreciated that the retainer cloth is elongate enough to cover up to the upper edge of the airbag body when the airbag body and the retainer cloth are both flatly expanded. With this arrangement, upon deployment of the airbag body, even if the driver's side wall of the airbag body nearly contacts with key accessories after the protecting cloth is expanded but before covers the back side of accessories, the retainer cloth is able to protect the airbag body and prevents the same from contacting with the accessories, since the retainer cloth is located up to the upper end of the driver's side wall.

BRIEF DESCRIPTION OF DRAWINGS

FIG. 5 is a schematic section taken along line V—V in FIG. 4;

FIGS. 7A and 7B illustrate the folding process of the airbag of FIG. 4, following FIG. 6C;

FIGS. 14A and 14B illustrate the modification of the folding method of the airbag of FIG. 4, following FIG. 13C.

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

Figure 1:
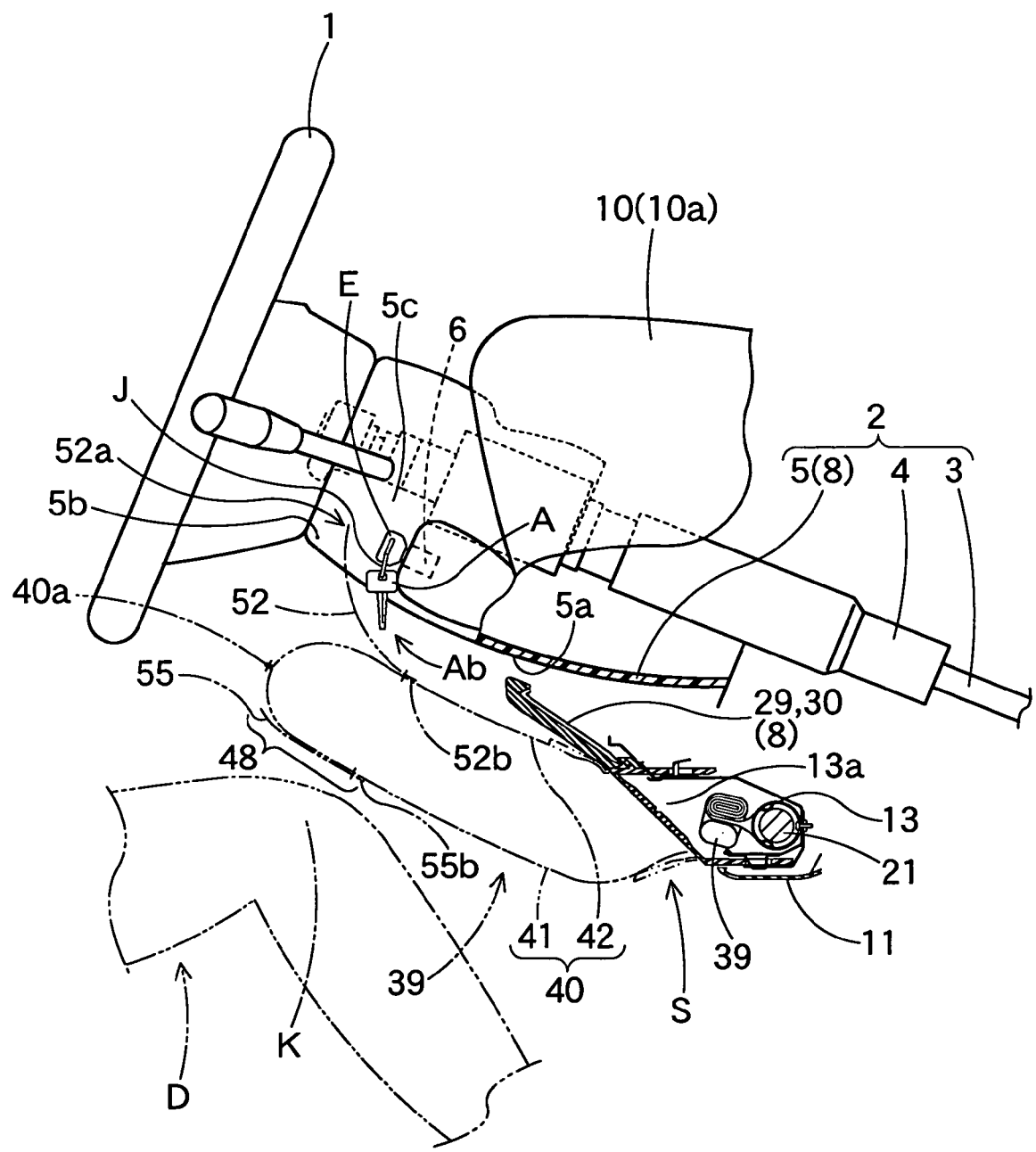
FIG. 1 is a schematic vertical section of an embodiment of the knee-protecting airbag device according to the present invention in service, taken along the front-rear direction of the vehicle.
Figure 10A:
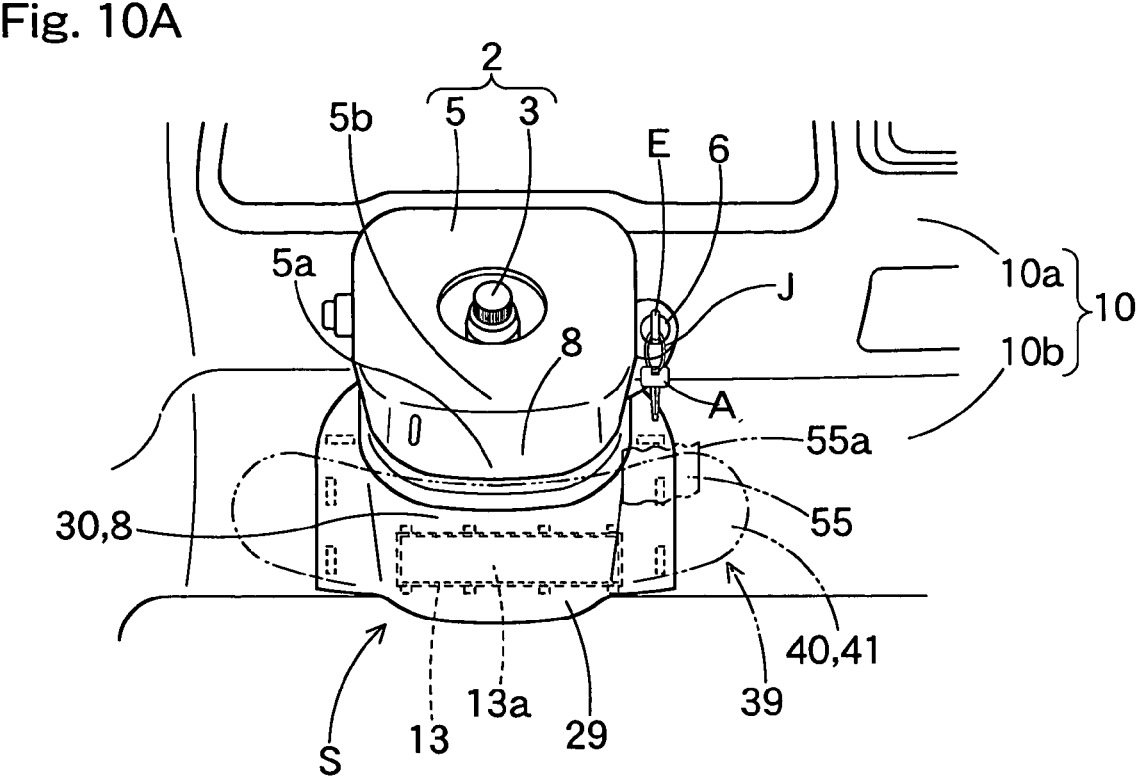
FIGS. 10A and 10B are schematic front views illustrating the deployment process of the knee-protecting airbag device of FIG. 1.

It is shown in FIGS. 1 and 10 that a knee-protecting airbag device S is located below the steering column 2 and in front of a driver D for protecting knees K of the driver D.

Up-down, front-rear, and left-right in this specification are based on a state in which the airbag device S is mounted on the vehicle, and therefore, correspond to up-down, front-rear, and left-right of the vehicle with the airbag device mounted thereon.

Referring to FIG. 1, the steering column 2 includes a main shaft 3 connected to a steering wheel 1, a column tube 4 for covering the main shaft 3, and a column cover 5 for covering those members.

The column cover 5 is made of synthetic resin into a substantially square cylindrical shape, and is so located along the axial direction of the main shaft 3 as to cover the main shaft 3 and the column tube 4 located below the steering wheel 1. The column cover 5 is located to ascend obliquely backward from an instrument panel (as will be called "dashboard" herein below) 10. In the right side 5c of the column cover 5 is located a key cylinder 6 to insert an ignition key E for starting engine thereinto. In the illustrated embodiment, accessories A such as a spare key (as will be called "key accessories A") are hung down from the ignition key E inserted in the key cylinder 6 by a connecting means J such as a connecting ring.

The knee-protecting airbag device S includes a folded airbag 39, an inflator 21 for supplying the airbag 39 with inflation gas, a housing 13 opened rearward for housing the folded airbag 39 and the inflator 21, and an airbag cover 29 for covering rearward of the housing 13.

Figure 2:
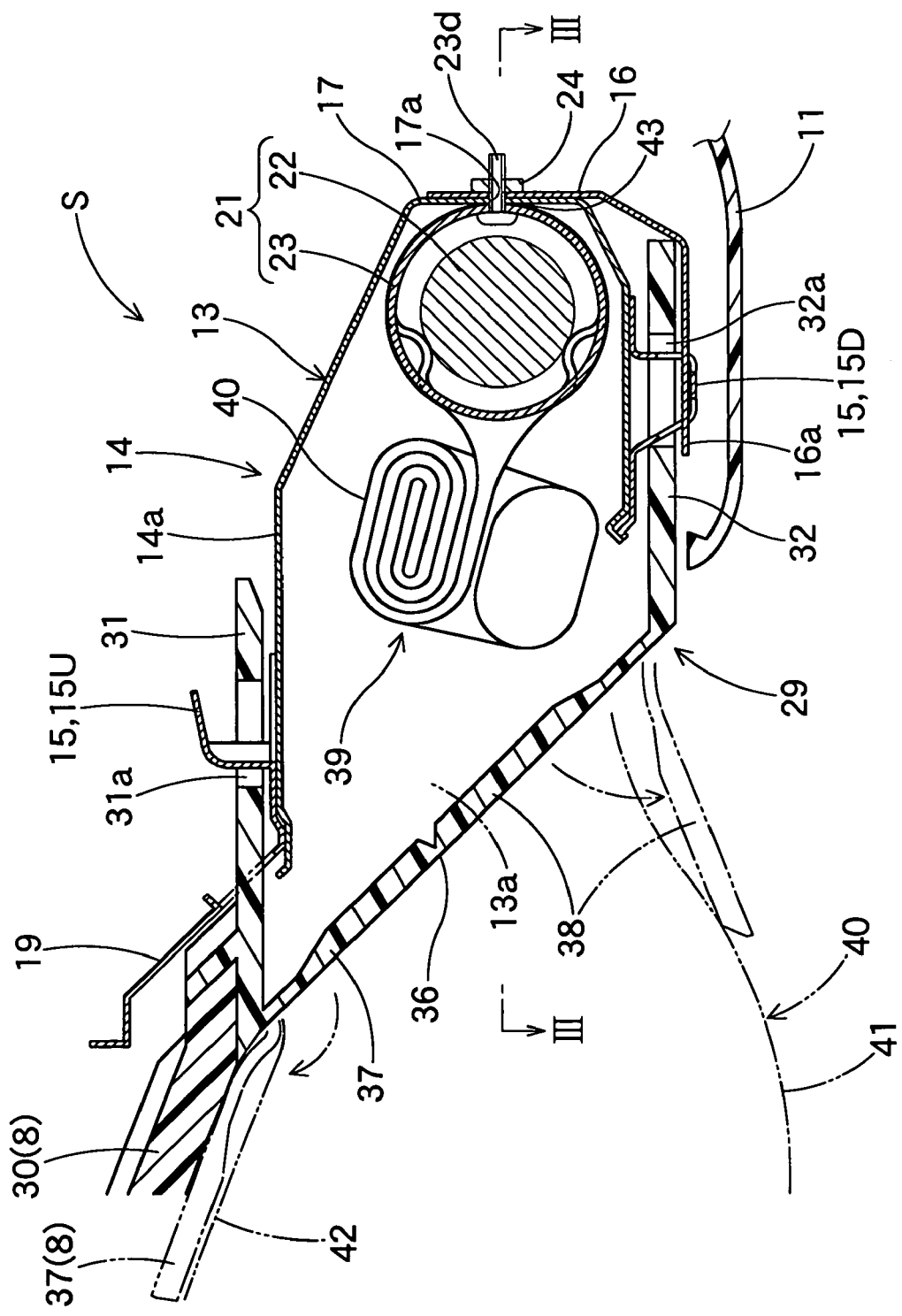
FIG. 2 is a schematic enlarged vertical section of the knee-protecting airbag device of FIG. 1, taken along the front-rear direction of the vehicle.
Figure 3:
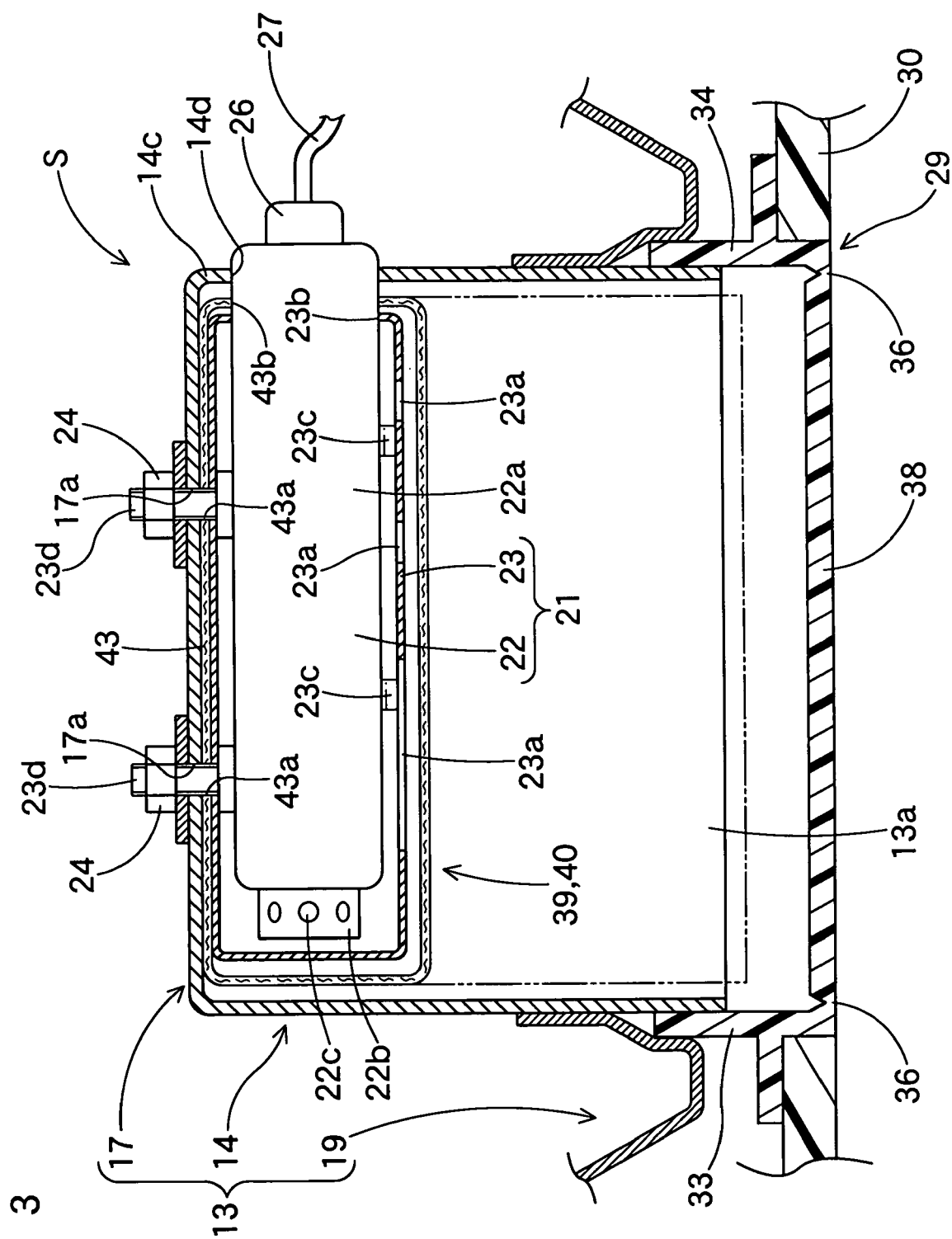
FIG. 3 is a schematic enlarged cross section of the knee-protecting airbag device of FIG. 1 taken along the front-rear direction of the vehicle, and corresponds to line III—III in FIG. 2.

The housing 13 is made of sheet metal. Referring to FIGS. 1 to 3, the housing 13 is located below the steering column 2, and includes a substantially square cylindrical circumferential wall portion 14, a bottom wall 17 for closing vehicle's front side of the circumferential wall portion 14, and a substantially rectangular opening 13a located at the vehicle's rear side. The circumferential wall portion 14 of the housing 13 is provided, on outer surfaces of its walls 14a and 14b confronting each other in the vertical direction, with a plurality of retainers 15 (15U and 15D) for attaching later-described side walls 31 and 32 of the airbag cover 29 to the housing 13.

Each of the retainers 15U formed on the outer surface of the upper wall 14a is formed into a hook shape and adapted to be inserted in a retaining hole 31a in the upper side wall 31 of the airbag cover 29, and retain edges of the retaining holes 31a. Corresponding to the retaining holes 31a in the upper side wall 31, the retainers 15U are located in plurality along the vehicle's transverse direction. Each of the retainers 15D is formed into a projection shape and is adapted to be inserted in a retaining hole 32a in the lower side wall 32 of the airbag cover 29. The retainers 15D are also located in plurality along the vehicle's transverse direction correspondingly to the retaining holes 32a in the lower side wall 32. A locking member 16 is inserted into each of the retaining projections 15D for preventing the projections 15D from coming off from the retaining holes 32a after once being put in the retaining holes 32a. The locking member 16 is attached to the housing 13 while having its insert portions 16a inserted respectively in between the outer surface of the lower side wall 32 and inner circumference of each of the retaining projections 15D.

Referring to FIG. 3, the circumferential wall portion 14 is further provided on its right side wall 14c with an insert hole 14d for inserting the end of inflator body 22 thereinto. The bottom wall 17 is provided with two insert holes 17a for inserting individual bolts 23d of the inflator 21 thereinto.

The housing 13 further includes a flange 19 extended outwardly from the circumferential wall portion 14 to encircle the opening 13a. The housing 13 is secured to vehicle body utilizing unillustrated brackets protruded from predetermined positions of the flange 19, the circumferential wall portion 14 and the bottom wall 17.

Referring to FIGS. 2 and 3, the inflator 21 is of a cylinder type which locates its axial direction along the vehicle's transverse direction, and includes a substantially cylindrical body 22 and a diffuser 23. The body 22 includes a substantially cylindrical general portion 22a and a small diameter portion 22b protruded from an end face of the general portion 22a. The small diameter portion 22b includes in its outer circumference with a plurality of gas discharge ports 22c. The other end face of the general portion 22a apart from the small diameter portion 22b is connected with a connector 26 for inputting actuating signals via a lead wire 27.

The diffuser 23 has a substantially cylindrical shape for covering the inflator body 22, and is closed at one end in its length direction and opened at the other end, which serves as an insert hole 23b. The diffuser 23 is provided in its rear side face as mounted on the vehicle with a plurality of gas outlet ports 23a for emitting inflation gas. The diffuser 23 further includes a plurality (two, in the illustrated embodiment) of bolts 23d protruded forward of the vehicle, and a plurality of clamping portions 23c for holding the body 22. To attach the inflator body 22 to the diffuser 23, the body 22 is inserted into the diffuser 23 through the insert hole 23b, from the small diameter portion 22b. Then each of the clamping portions 23c is pressed onto the outer circumference of the general portion 22a. Thus the body 22 is fixed to the diffuser 23. If each of the bolts 23d is inserted into the through hole 17a of the bottom wall 17 of the housing 13, and then a nut 24 is fastened with the bolt 23d, the inflator 21 is secured to the housing 13.

The inflator 21 is actuated by an actuating signal inputted through the lead wire 27 when the airbag actuating circuit mounted on the vehicle detects frontal collision of the vehicle. At this time, an unillustrated airbag device mounted on the steering wheel 1 is actuated simultaneously.

The airbag cover 29 is configured to cover the vehicle's rearward of the opening 13a and the flange 19 of the housing 13, and is joined with and supported by the housing 13. As referred to FIGS. 1 and 10, the airbag cover 29 is located toward a lower panel 10b of the dashboard 10, which is composed of an upper panel 10a and a lower panel 10b, in the periphery of the column cover 5, for covering the lower periphery of the column cover 5 protruded from the dashboard 10.

The airbag cover 29 includes two doors 37 and 38 covering the opening 13a of the housing 13 at the vehicle's rear side, and a general portion 30 that is located around the doors 37 and 38 and is enclosed by the lower panel 10b when it is mounted on the vehicle. The airbag cover 29 is a two-color part whose part including the doors 37 and 38 and the side walls 31, 32, 33 and 34 is made from thermoplastic elastomer of polyolefin or the like, while the general portion 30 located around those members is made from synthetic resin such as polypropylene.

The doors 37 and 38 are respectively formed in a substantially rectangular plate shape, and are provided therearound with a thin breakable portion 36 having an H shape. The breakable portion 36 is so provided with continuous or intermittent grooves in the vehicle's front side face of the airbag cover 29 as to be easily broken when the doors 37 and 38 are pushed by the inflating airbag 39. When the breakable portion 36 is pushed and broken by the airbag 39, the door 37 opens upward around its upper end near the upper side wall 31, and the door 38 opens downward around its lower end near the lower side wall 32.

From the periphery of the doors 37 and 38 are protruded forward four side walls 31, 32, 33 and 34 to neighbor the circumferential wall portion 14 of the housing 13 from outside. The airbag cover 29 is joined to and held by the housing 13 at the upper side wall 31 located above the case circumferential wall portion 14 and the lower side wall 32 located below the circumferential wall portion 14. As described above, the walls 31 and 32 are provided with retaining holes 31a and 32a, respectively, in which the individual retainers 15 (15U and 15D) located in the circumferential wall portion 14 are inserted and held.

The airbag 39 takes a substantially rectangular plate shape when expanded and inflated completely, as shown in FIGS. 1, 4 to 5, and 10. The airbag 39 is transversely wide enough to protect both knees K of the driver D. The airbag 39 includes a bag-shaped bag body 40, a protecting cloth 52, and a retainer cloth 55.

The airbag body 40 is configured to locate its driver's side wall 41 toward the driver D, and its column side wall 42 toward the column cover 5 when completely deployed. The walls 41 and 42 have substantially the same shapes.

The airbag body 40 is composed of a single body cloth which has a shape in which the walls 41 and 42 are connected at the lower end 40b of the airbag 40. The body cloth is made of flexible fabric woven of polyester, polyamide yarns or the like, together with the protecting cloth 52 and the retainer cloth 55.

Figure 10B:
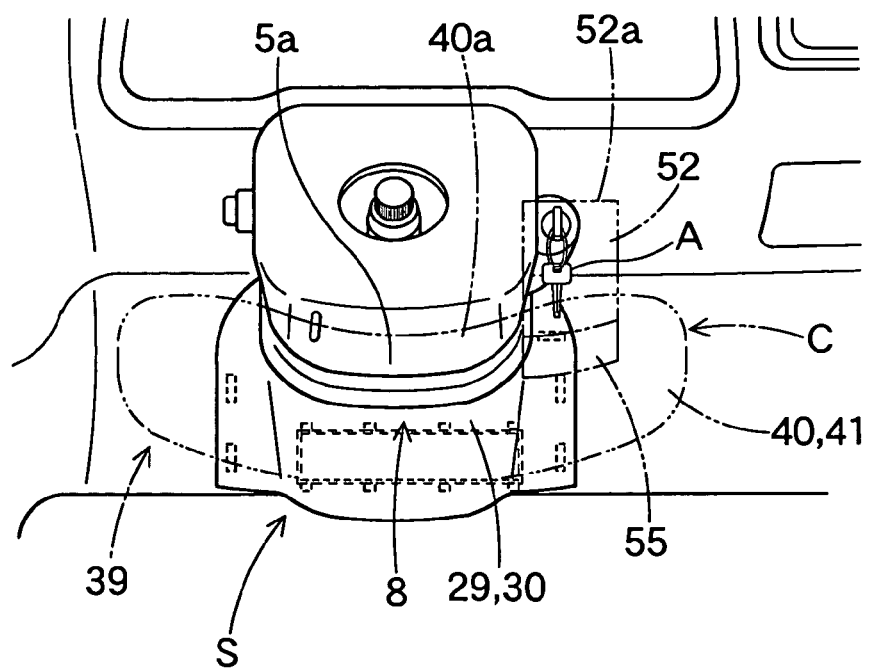

In this airbag body 40, a portion around the right edge corner C in the upper edge 40a, as mounted on the vehicle and completely deployed, serves as a cover area 48 for covering the lower side or back side of key accessories A of a key E inserted in the key cylinder 6 and touching the accessories A, as shown in FIGS. 1 and 10B.

Figure 4:
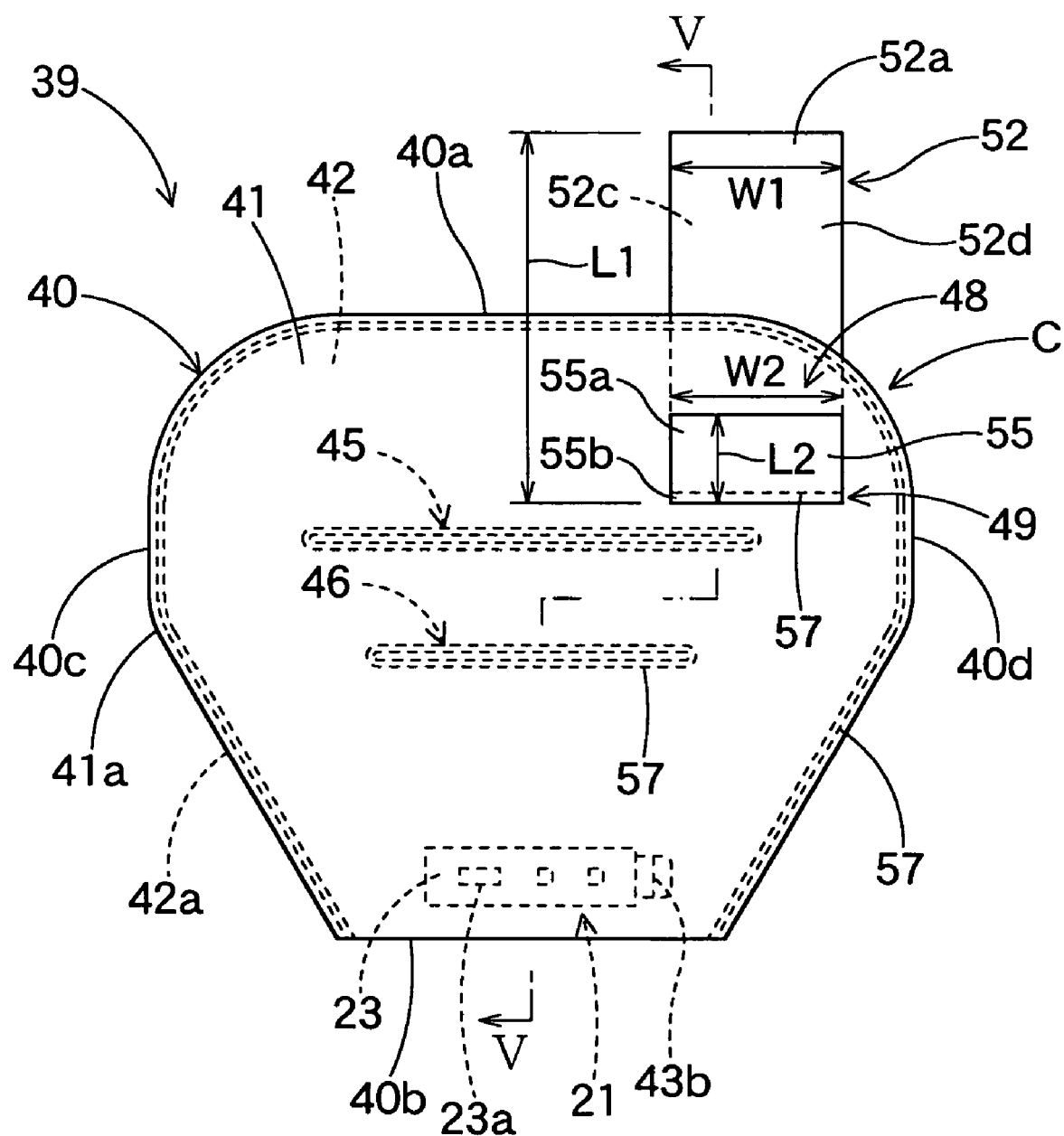
FIG. 4 is a schematic front view of an airbag used in the airbag device of FIG. 1, as expanded and has an inflator located therein.

Referring to FIGS. 4 and 5, the airbag body 40 is internally provided with two tethers 45 and 46 arranged along the transverse direction in up and down rows. Each of the tethers 45 and 46 is adapted to join the walls 41 and 42 and keep the inflated airbag body 40 in a plate-like shape. Each of the tethers 45 and 46 is made of two pieces of cloth member 45a or 46a which are connected to either one of the walls 41 and 42 and joined to each other.

As shown in FIGS. 3 and 6, the airbag body 40 is provided in a portion 43 near the lower edge 40b in the column side wall 42 with two insert holes 43a and an insert hole 43b. The insert holes 43a are for inserting the individual bolts 23d of the inflator 21 therethrough, and the insert hole 43b is for inserting the body 22 of the inflator 21 therethrough. The airbag body 40 is attached to the housing 13 with the inflator body 22 protruded from the insert hole 43b, and with the peripheries 43 of the individual insert holes 43a clamped by the diffuser 23 and the bottom wall 17 of the housing 13. In other words, the airbag body 40 is secured to the bottom wall 17 of the housing 13 by the insert holes 43a peripheries serving as a mounting portion 43.

As best shown in FIG. 4, the protecting cloth 52 has a rectangular shape longer in the vertical direction, and is joined to the column side wall 42 for covering the cover area 48 in the column side wall 42. The protecting cloth 52 is joined at the lower end 52b to the column side wall 42 in an area 49 below the cover area 48, by stitching with stitching yarn 57, while leaving the upper end 52a as free end. The dimension W1 of the protecting cloth 52 in the left-right direction is greater than the width of the cover area 48, and the dimension L1 in the vertical direction is predetermined such that the upper end 52a as the protecting cloth 52 is flatly expanded extends upward than the upper edge 40a of the airbag body 40. In the illustrated embodiment, moreover, the dimension L1 is predetermined such that the protecting cloth 52 may cover not only the back side of key accessories A but also the back side of the key E itself when sprung up upon deployment of the airbag 39, as shown in FIG. 1.

The retainer cloth 55 has a rectangular shape longer in the left-right direction, and is joined to the driver's side wall 41 for covering the cover area 48 in the driver's side wall 41. The retainer cloth 55 is joined at the lower end 55b to the driver's side wall 41 in the area 49 below the cover area 48, by stitching with stitching yarn 57, while leaving the upper end 55a as free end. The dimension W2 of the retainer cloth 55 in the left-right direction is greater than the width of the cover area 48, and the dimension L2 in the vertical direction is predetermined such that the retainer cloth 55 may be able to cover the upper end 52b of the protecting cloth 52 provided that the protecting cloth 52 is extended toward the driver's side wall 41 side. In other words, the retainer cloth 55 extends up to the vicinity of the upper edge 40a of the airbag body 40.

As shown in FIG. 5, the lower ends 52b and 55b of the protecting cloth 52 and the retainer cloth 55 are joined to the walls 41 and 42, respectively, at substantially the same level from the upper edge 40a of the airbag body 40.

To manufacture the airbag 39, the protecting cloth 52 and the retainer cloth 55 are firstly located in predetermined positions on the outer surface of the body cloth having the driver's side wall 41 and the column side wall 42 of the airbag body 40, and are stitched thereto by stitching yarn 57 at the lower ends 52b and 55b. The body cloth is provided with the insert holes 43a and 43b in advance.

Thereafter, ends of the cloth members 45a and 46a for forming the tethers 45 and 46 are sewn to predetermined positions in the body cloth to be the inner surface of the airbag body 40 by stitching yarn 57. The body cloth is then folded in two at a position to be the lower edge 40b of the airbag body 40, and the cloth members 45a and 46a are sewn up to each other, respectively, to form the tethers 45 and 46. If then the overlaid outer edges of the body cloth, or the outer edges 41a and 42a of the walls 41 and 42 are sewn up by stitching yarn 57, the airbag body 40, i.e., the airbag 39 is complete. The inflator 21 is located within the airbag body 40 before the entire outer edges 41a and 42a are sewn up, and the stitching work is completed thereafter.

To assemble the airbag device S, the airbag 39 with the inflator 21 housed in the airbag body 40 is so folded as to be housed within the housing 13. The inflator 21 is housed in the airbag body 40 such that the bolts 23d are protruded from the individual insert holes 43a, and the end of the inflator body 22 is protruded from the insert hole 43b.

Folding process of the airbag 39 consists of a transverse folding step in which the upper edge 40a of the airbag body 40 is brought close to the lower edge 40b on folds along the transverse direction, and a vertical folding step to adjust the transverse width of the airbag body 40 to fit the width of the housing 13 on folds along the vertical direction (or front-rear direction). In the illustrated embodiment, the airbag 39 firstly goes through the transverse folding step, in which the protecting cloth 52 is folded up together, and then goes through the vertical folding step.

Figure 6A:
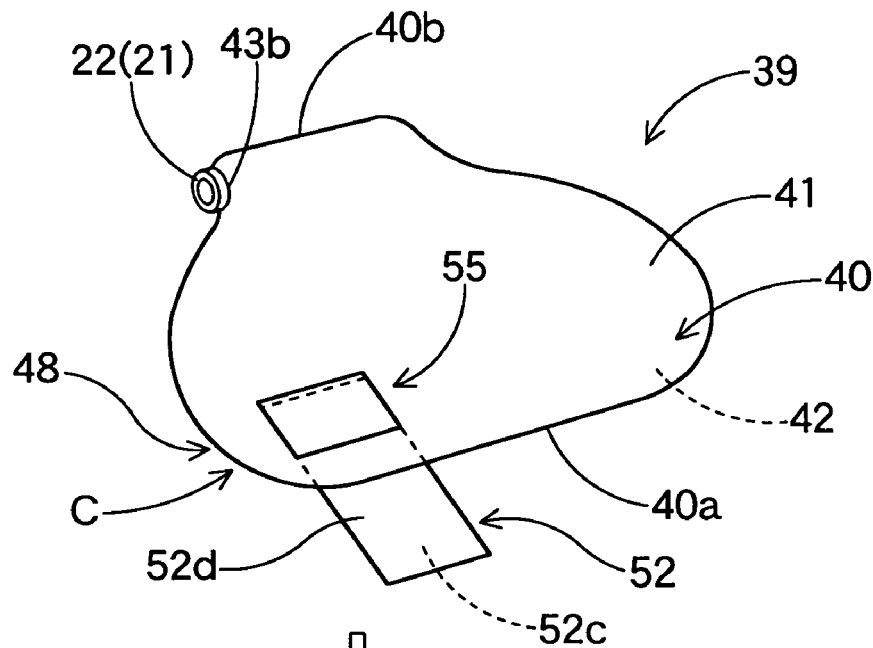
FIGS. 6A to 6C illustrate a folding process of the airbag of FIG. 4.
Figure 6B:
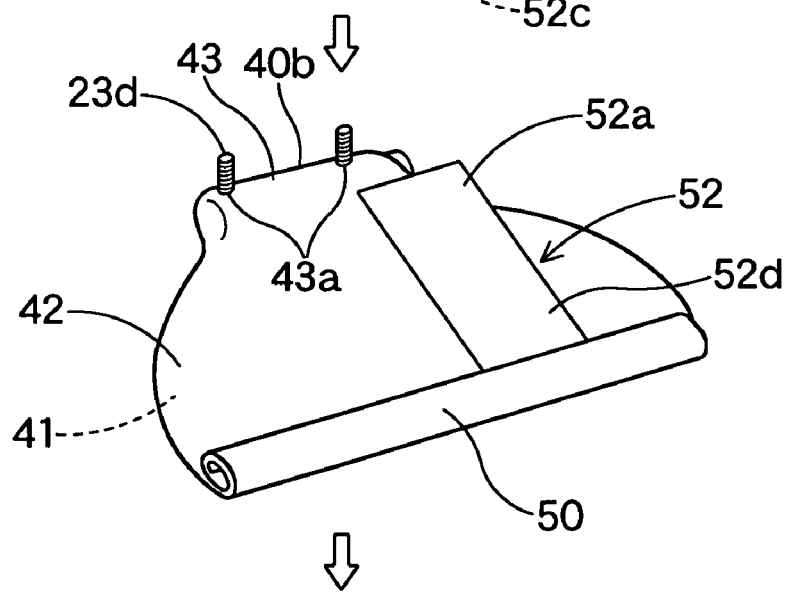
Figure 6C:
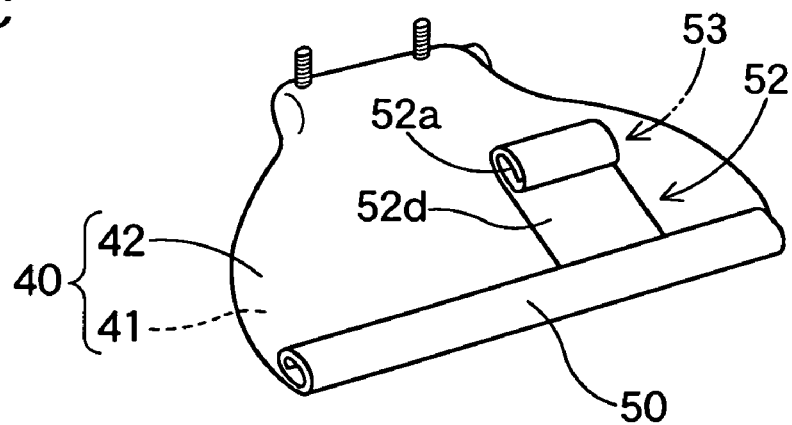

More specifically, as shown in FIG. 6A, the airbag body 40 is flatly expanded firstly, such that the column side wall 42 and the driver's side wall 41 are overlaid on each other, and the protecting cloth 52 and the retainer cloth 55 are flatly expanded. Then as shown in FIG. 6B, the upper edge 40a of the airbag body 40 is roll-folded on the column side wall 42 toward the lower edge 40b, until the vicinity of the lower end 55b of the retainer cloth 55 (being also the lower end 52b of the protecting cloth 52), as referred to a sectional view in FIG. 7B. The portion folded by this point will be called below a folded upper edge portion 50. As shown in FIG. 6C, subsequently, the upper edge 52a of the protecting cloth 52 is roll-folded toward the lower end 52b. Here, the upper end 52a is rolled toward the airbag body 40, provided the protecting cloth 52 is flatly expanded together with the airbag body 40 as shown in FIG. 6A. In FIG. 6C, the protecting cloth 52 is shown as folded back upside down at the lower end 52b, and therefore, it appears to be folded in a direction away from the airbag body 40. To paraphrase, supposing a side of the protecting cloth 52 facing toward the column cover 5 (or the key E) is a front face 52c, while the opposite side facing toward the driver D is a back face 52d, upon deployment of the airbag 39 and the protecting cloth 52, as referred to FIGS. 6A, 6B and 6C, the upper end 52a of the protecting cloth 52 is roll-folded on the back face 52d.

Subsequently, an upper end portion 53, which is formed by roll-folding of the upper end 52a of the protecting cloth 52, is put on the folded upper edge portion 50 of the airbag body 40 with the retainer cloth 55 opened, as shown in FIG. 7A. Then as shown in FIG. 7B, the upper end portion 53 of the protecting cloth 52 is covered by the retainer cloth 55, and a breakable tape member 58 is applied to hold the retainer cloth 55 so as to prevent the retainer cloth 55 from riding up in a subsequent roll-folding step.

Figure 8A:
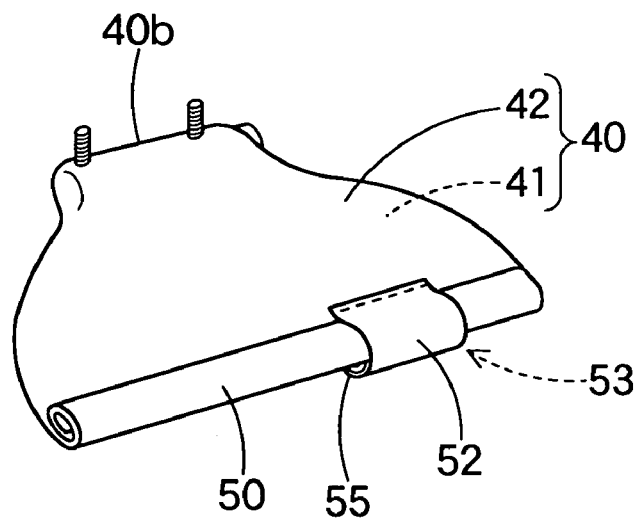
FIGS. 8A to 8C illustrate the folding process of the airbag of FIG. 4, following FIG. 7B.
Figure 8B:
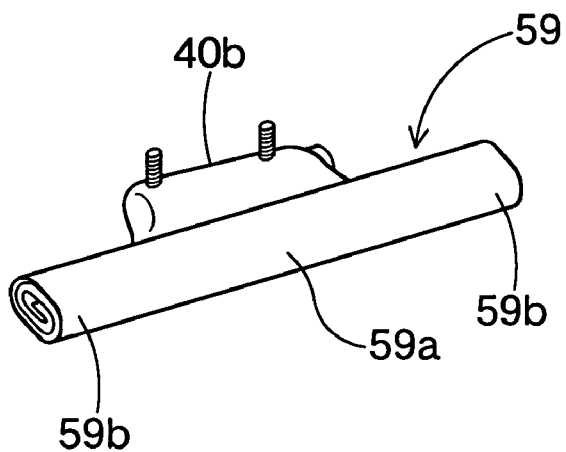

In that state, the upper edge side 40a of the airbag body 40 is roll-folded on the column side wall 42 toward the lower edge 40b, as shown in FIGS. 8A and 8B, so that the transverse folding process is complete.

Figure 8C:
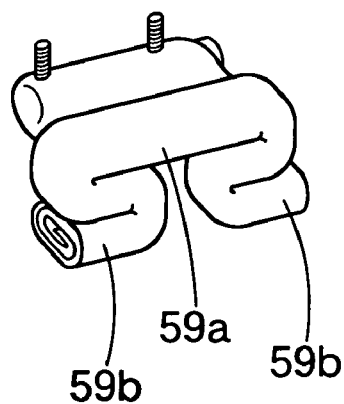

Then the vertical folding process is applied. Left and right edges 59b of a roll-folded portion 59, as referred to FIG. 8C, are folded to be located below the center 59a of the folded portion 59 such that the transverse width of the airbag 39 fits in the housing 13, and thus the folding process of the airbag 39 is completed.

Thereafter, an unillustrated breakable wrapping member is wrapped around the airbag 39 for keeping the folded-up shape. At this time, the bolts 23d of the inflator 21 and the end of the inflator body 22 which are protruded from the insert holes 43a and 43b are taken out from the wrapping member. Other than resin sheet member, cloth member such as a woven fabric that forms the airbag body 40, tape member, or string member may be employed as the wrapping member.

Thereafter, the inflator 21 is housed in the housing 13 together with the folded airbag 39 so that the individual bolts 23d of the inflator 21 are protruded from the insert holes 17a while the end of the inflator body 22 is protruded from the insert hole 14d. Then if unillustrated spring nuts are fastened with the individual bolts 23d, the inflator 21 and the airbag 39 are housed in and attached to the housing 13.

Subsequently, the airbag cover 29 is attached to the housing 13. More specifically, the individual side walls 31, 32, 33 and 34 of the airbag cover 29 are located around the circumferential wall portion 14 of the housing 13 from the opening 13a. At this time, the individual hooks 15U are so inserted into the retaining holes 31a in the upper side wall 31 as to be retained there at, and the individual projections 15D are inserted into the corresponding retaining holes 32a in the lower side wall 32 so as to project on the outer surface of the lower side wall 32. Then the insert portions 16a of the locking member 16 are inserted between the outer surface of the lower side wall 32 and the inner circumference of the individual projections 15D, the individual bolts 23d are put through the locking member 16, and the nuts 24 are fastened with the bolts 23d. Thus the airbag cover 29 is joined to and held by the housing 13, and the airbag device S is completed.

Then the airbag device S is mounted on the vehicle by connecting the connector 26 having the lead wire 27 joined thereto to the body 22 of the inflator 21, securing the brackets extending from the housing 13 to the vehicle body, and connecting the lead wire 27 to the airbag actuating circuit.

The upper panel 10a and the lower panel 10b have been attached to the vehicle by this time. An under cover 11 (shown in FIGS. 1 and 2) is attached after the airbag device S is mounted on the vehicle.

After the airbag device S is mounted on the vehicle, if a predetermined actuating signal is inputted to the inflator body 22 via the lead wire 27, inflation gas is discharged from the gas discharge ports 22c of the inflator 21. The gas then flows into the airbag body 40 of the airbag 39 via the gas outlet ports 23a of the diffuser 23. The airbag body 40 inflates and breaks the wrapping member, pushes the doors 37 and 38 of the airbag cover 29, and breaks the breakable portion 36 to open the doors 37 and 38. Then as indicated by double-dotted lines in FIG. 1, the airbag body 40 protrudes rearward from the opening 13a of the housing 13, and further expands and inflates upward along the column cover lower surface 5a of the steering column 2.

In the knee-protecting airbag device S, as shown in FIGS. 9A, 9B, 10A and 10B, when the airbag 39 unfolds its roll-folding in the transverse folding, the protecting cloth 52 also unfolds together with the upper edge 40a of the airbag body 40. Since the upper end 52a of the protecting cloth 52 is a free end, the upper end 52a is released from the retainer cloth 55 and rises in advance of the upper end 40a of the airbag body 40, so that the protecting cloth 52 covers accessories A of the key E from the lower side to the back side, and further may wrap the accessories A.

Accordingly, even when the airbag body 40 approaches the key accessories A later on, the airbag body 40 is able to complete deployment smoothly, since the protecting cloth 52 is interposed between the airbag body 40 and the accessories A, and the protecting cloth 52 protects the airbag body 40. After the airbag body 40 completes deployment, the flexible protecting cloth 52 falls down due to gravity from the state indicated by double-dotted lines in FIG. 1, and comes to abut against the vicinity of the upper edge 40a of the airbag body 40.

Moreover, when the airbag 39 unrolls, the upper end 52a or the free end side of the protecting cloth 52 is covered by the retainer cloth 55. Accordingly, although the airbag 39 deploys in a narrow space between the driver D and a member 8 located toward the column cover 5 (such as the column cover 5 itself, part of the airbag cover 20 except the door portion, or open door 37, etc.), the retainer cloth 55 does not make the free end side 52a of the protecting cloth 52 contact with the column cover member 8 until the retainer cloth 55 stops contacting with the column cover member 8. That is, the free end side 52a of the protecting cloth 52 is not turned over until right before the upper edge 40a of the airbag body 40 completes unrolling. After the retainer cloth 55 stops contacting with the member 8 located toward the column cover, the free end 55a of the retainer cloth 55 becomes openable, and the free end side 52a of the protecting cloth 52 opens the retainer cloth 55, and springs up due to inertia force of unrolling of the airbag body 40 for covering the back side of the key accessories A.

If the airbag body 40 is not provided with the retainer cloth 55 while including the protecting cloth 52, when the airbag body 40 deploys in a narrow space between the driver D and the member 8 of the column cover, the free end side 52a of the protecting cloth 52 may be made immobile due to friction with the column cover member 8. Then the protecting cloth 52 may not be able to spring up prior to the airbag body 40, and therefore, may not be able to cover the lower side or the back side of the key accessories A.

In the knee-protecting airbag device S, therefore, the airbag body 40 is able to complete deployment and protect the knees K of driver D securely since the airbag body 40 is protected by the protecting cloth 52, even if the deploying airbag 39 contacts the accessories A connected to the key E. Especially, even if the airbag 39 deploys in a narrow space between the driver D and the member 8 of the column cover 5, the protecting cloth 52 is able to cover the lower side or the back side of the key accessories A securely, which enables the completely deployed airbag body 40 to protect the knees K of the driver D securely.

In the foregoing embodiment, in the transverse folding process of the airbag 39, the upper edge portion 50 of the airbag body 40 is firstly folded on transverse folds up to the vicinity of joint position 55b of the retainer cloth 55 to the driver's side wall 41, as shown in FIGS. 6B, 6C and the sectional view in FIG. 7C, while the upper end side 52a of the protecting cloth 52 is folded toward the lower end 52b. Then as shown in FIGS. 7A and 7B, the folded upper part 53 of the protecting cloth 52 is put on the folded upper edge portion 50 in the driver's side wall 41, and the retainer cloth 55 is further superposed on the folded upper part 53 of the protecting cloth 52. Then the transverse folding of the airbag 39 is completed as shown in FIGS. 8A and 8B.

Figure 9A:
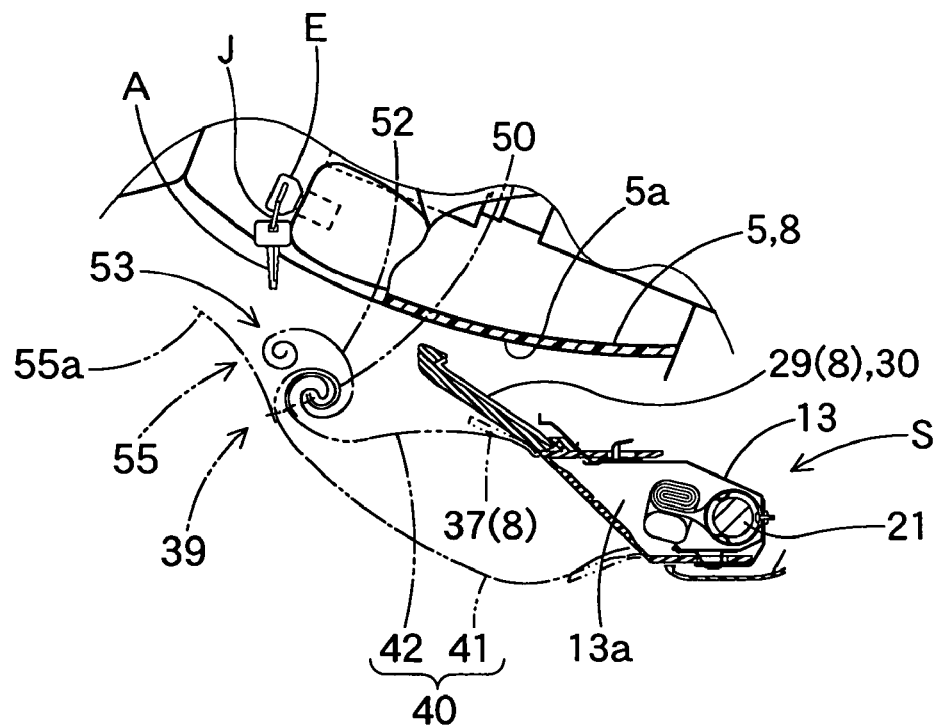
FIGS. 9A and 9B are schematic sections illustrating the deployment process of the knee-protecting airbag device of FIG. 1.
Figure 9B:
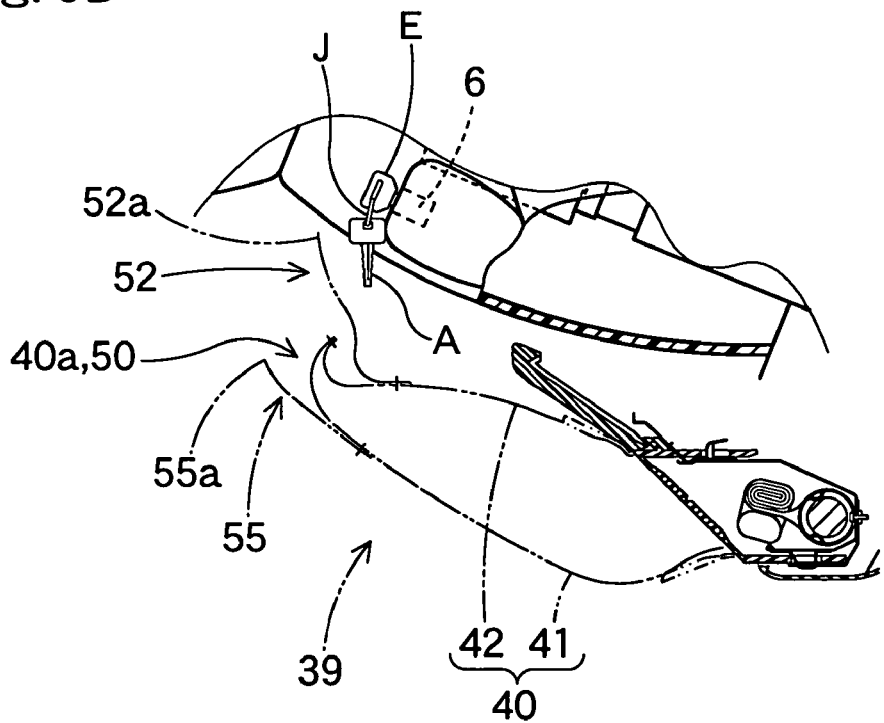

When the airbag body 40 unrolls, with this arrangement, the folded upper end part 53 of the protecting cloth 52 put on the upper edge portion 50 is easily sprung up by the upper edge portion 50 of the airbag body 40, as shown in FIG. 9A. Therefore, the protecting cloth 52 is able to cover the back side of the key accessories A in a wide area up to the upper side, and the contact of the airbag body 40 with the key accessories A is further prevented.

Without considering the above point, it will also be appreciated that the upper end 52a of the protecting cloth 52 is extended over the upper edge 40a of the airbag body 40 which is not folded, and put on the driver's side wall 41 with the retainer cloth 55 opened, and then the retainer cloth 55 is superposed over the upper end 52a, and in that state the airbag body 40 is roll-folded together with the protecting cloth 52 and the retainer cloth 55.

Moreover in the foregoing embodiment, the upper end 52a of the protecting cloth 52 is folded toward the airbag body 40 in a condition that the protecting cloth 52 is flatly expanded together with the airbag body 40. In other words, the upper end 52a of the protecting cloth 52 is roll-folded in the back face 52d of the protecting cloth 52 toward the lower end 52b, and then put on the folded upper edge portion 50 of the airbag body 40.

With this arrangement, even if the folded upper end portion 53 of the protecting cloth 52 contacts with the key accessories A when sprung up and unrolling along with the unfolding of the upper edge portion 50 of the airbag body 40, the upper end 52a is able to unroll easily while contacting with the accessories A, so that the protecting cloth 52 is able to cover the back side of key accessories A smoothly.

Figure 11:
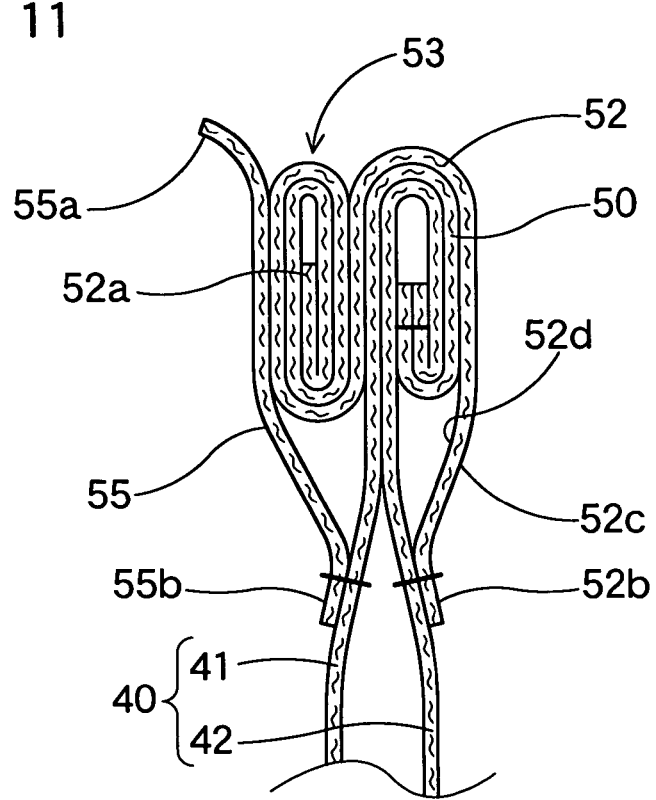
FIG. 11 is a partial section of the upper edge of the airbag body showing a modification of the transverse folding method of the airbag in FIG. 4.
Figure 12:
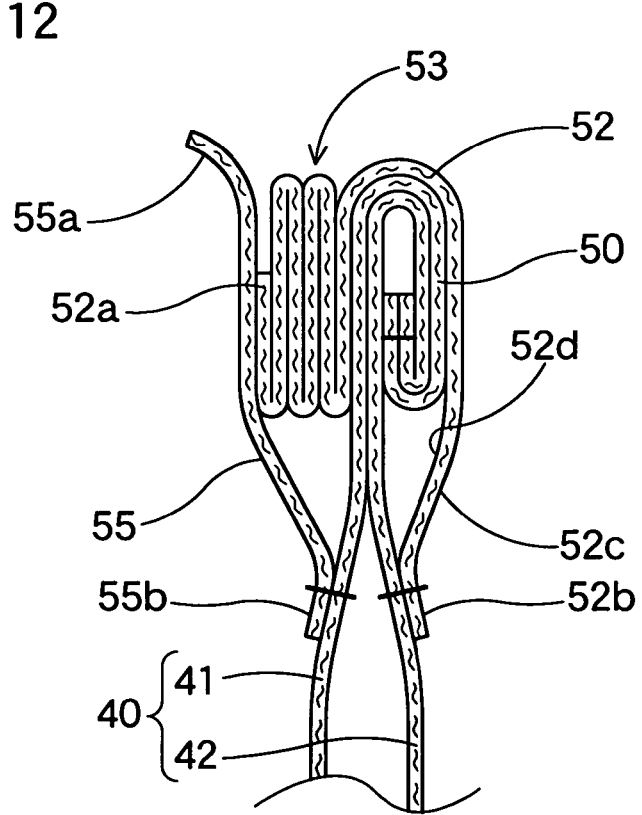
FIG. 12 is a partial section of the upper edge of the airbag body showing another modification of the transverse folding method of the airbag in FIG. 4.

Without considering the above point, the protecting cloth 52 may be roll-folded in its front face 52c, when forming the folded upper end portion 53, and then put on the upper edge portion 50 of the airbag body 40, as shown in FIG. 11. Alternatively, the protecting cloth 52 may be bellows-folded as shown in FIG. 12, when forming the folded upper end portion 53, and then put on the upper edge portion 50 of the airbag body 40. Even with these folding methods, the folded upper end portion 53 of the protecting cloth 52 is put on the upper edge portion 50 of the airbag body 40 in the driver's side wall 41. Accordingly, if the airbag body 40 thereafter is roll-folded in the column side wall 42 to complete the transverse folding, the upper edge portion 50 of the airbag body 40 is able to spring up the folded upper edge part 53 of the protecting cloth 52 put thereon easily. Consequently, the protecting cloth 52 is able to cover the back side of the key accessories A in a wide area up to the upper side.

Figure 13A:
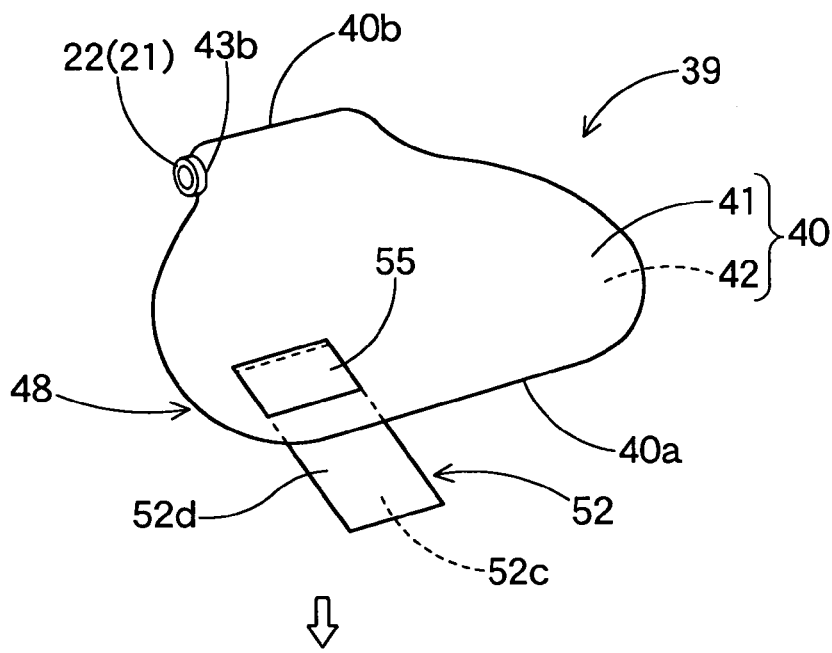
FIGS. 13A to 13C illustrate a modification of the folding method of the airbag of FIG. 4.
Figure 13B:
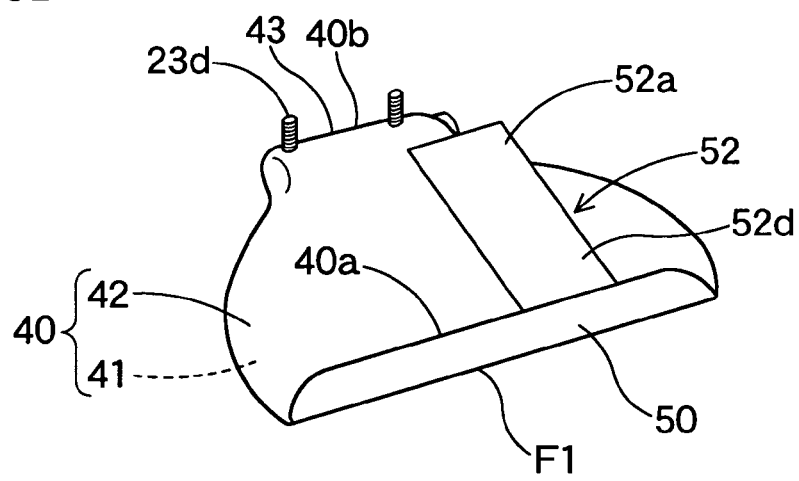
Figure 13C:
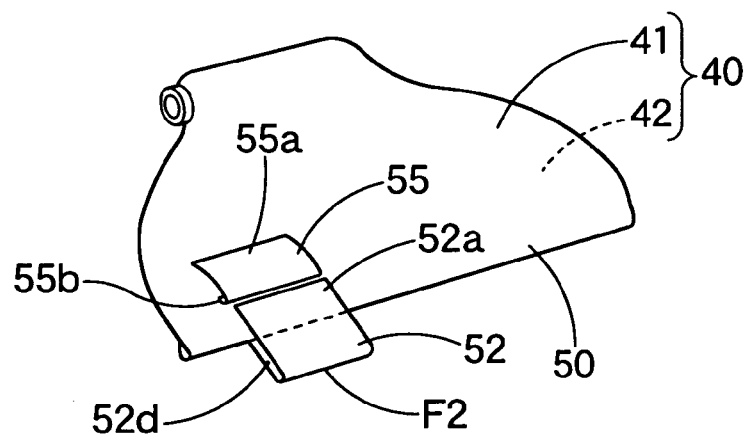

Although the foregoing embodiment shows the airbag 39 in which the upper edge portion 50 of the airbag body 40 and the upper end portion 53 of the protecting cloth 52 are both roll-folded, the following transverse folding method may be applied to the airbag 39 to reduce number of processes and cost of the folding process: Firstly as shown in FIG. 13A, the airbag body 40 is flatly expanded such that the column side wall 42 and the driver's side wall 41 are overlaid on each other, and the protecting cloth 52 and the retainer cloth 55 are flatly expanded, too. Then as shown in FIG. 13B, the upper edge 40a of the airbag body 40 is folded back once on a transverse fold F1 on the column side wall 42 toward the lower edge 40b, until the vicinity of the lower end 55b of the retainer cloth 55 (being also the lower end 52b of the protecting cloth 52), as referred to a sectional view in FIG. 14B. Thus a folded upper edge portion 50 is formed. As shown in FIGS. 13C and 14A, subsequently, with the retainer cloth 55 opened, the protecting cloth 52 is folded back on a transverse fold F2 to bring the upper end 52a closer to the lower end 52b, and the folded cloth 52 is further folded back on a fold F3. In other words, the upper end side 52a of the protecting cloth 52 is bellows-folded doubly to form an upper end portion 53, and this upper end portion 53 is put on the folded upper edge portion 50 of the airbag body 40 in the driver's side wall 41.

Figure 15A:
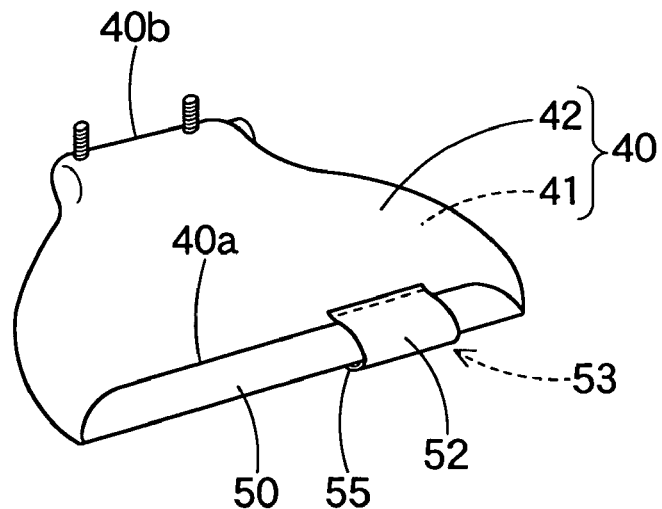
FIGS. 15A to 15C illustrate the modification of the folding method of the airbag of FIG. 4, following FIG. 14B.
Figure 15B:
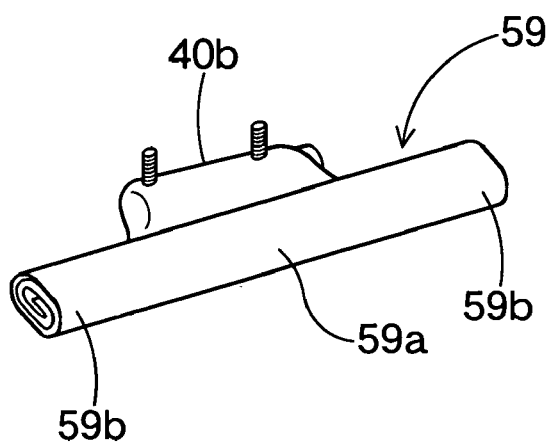
Figure 15C:
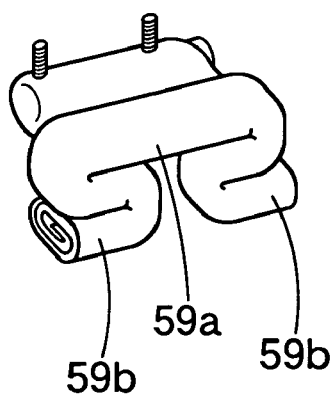

Thereafter, as shown in FIG. 14B, the retainer cloth 55 is superposed over the upper end portion 53, and a tape member 58 is applied to hold the retainer cloth 55. In that state, the upper edge side 40a of the airbag body 40 is roll-folded on the column side wall 42 toward the lower edge 40b, as shown in FIGS. 15A and 15B, so that the transverse folding process is completed. Then as shown in FIG. 15C, left and right edges 59b of a roll-folded portion 59 are folded to be located below the center 59a of the folded portion 59 such that the transverse width of the airbag 39 fits in the housing 13, and thus the folding process of the airbag 39 is completed.

The airbag thus folded is able to obtain substantially the same working-effects as the airbag shown in FIGS. 6 to 8.

Moreover, the length L2 of the retainer cloth may be predetermined elongate enough to cover the upper edge 40a of the airbag body 40 in a flatly expanded state together with the airbag body 40, as the retainer cloth 55A shown in FIG. 5 by double-dotted lines. With this arrangement, even if the driver's side wall 41 of the airbag body 40 nearly contacts with key accessories A after the protecting cloth 52 expands but before covers the back side of accessories A upon deployment of the airbag body 40, the elongate retainer cloth 55 protects the airbag body 40 and prevents the same from contacting with the accessories A, since the retainer cloth 55 is located up to the upper end 40a of the cover area 48.

Although the foregoing embodiments are described on the ground that the key cylinder 6 is located in the steering column 2 (column cover 5) itself, the protecting cloth 52 and the retainer cloth 55 of the present invention can also be applied to a case in which the key cylinder 6 is located on the dashboard 10 such as the upper panel 10a, if the airbag body 40 for a knee-protecting airbag device includes a cover area 48 which covers the lower side or the rear side of key accessories A of the key E inserted in the key cylinder 6 and is contactable with the accessories A.

Furthermore, even if the key cylinder 6 is located on the left side face of the column cover 5 or in the dashboard 10 leftward of the column cover 5, the protecting cloth 52 and the retainer cloth 55 of the present invention can also be applied thereto if the airbag for a knee-protecting airbag device includes a cover area 48 in the airbag which covers the lower side or the rear side of the key accessories A of the key E inserted into the key cylinder 6 and is contactable with the accessories A.

What is claimed is:

1. A knee-protecting airbag device comprising an airbag,
the airbag being folded and housed in a housing located below a steering column in front of a driver, and upon inflow of inflation gas, the airbag protruding rearward from the housing to deploy upward for protecting knees of the driver, wherein:
an upper edge portion of the airbag as completely deployed serves as a cover area for covering the lower side or back side of key accessories of a key inserted into a key cylinder and contactable with the accessories;
the airbag is roll-folded on a steering column side when the airbag is transversely folded to bring an upper edge thereof close to a lower edge side thereof;

the airbag comprises:

a bag-shaped airbag body including a driver's side wall and a column side wall, each of the walls being located toward the driver and the column cover, respectively, upon airbag deployment;

a protecting cloth joined to the column side wall for covering the cover area in the column side wall; and a retainer cloth;

the protecting cloth is joined at a lower end thereof to an area in the column side wall below the cover area while leaving an upper end thereof as free end;

the length of the protecting cloth is predetermined such that the protecting cloth extends over the upper edge of the airbag body when flatly expanded;

the retainer cloth is joined at a lower end thereof to an area in the driver's side wall below the cover area for covering an upper end part of the protecting cloth extended to the driver's side wall side; and the airbag is transversely folded and housed in the housing in a condition that the upper end part of the protecting cloth is extended to the driver's side wall side, and the retainer cloth is superposed over the upper end part of the protecting cloth.

2. The knee-protecting airbag device according to claim 1, wherein:

an upper edge portion of the airbag body is transversely folded up to the vicinity of a joint position of the retainer cloth to the driver's side wall, while the upper end part of the protecting cloth is folded toward the lower end of the protecting cloth; and the airbag is transversely folded and housed in the housing in a condition that the folded upper end part of the protecting cloth is put on the folded upper edge portion of the airbag body, and then the retainer cloth is superposed on the upper end part of the protecting cloth.

3. The knee-protecting airbag device according to claim 2, wherein the upper end part of the protecting cloth is roll-folded toward the airbag body in a condition that protecting cloth is flatly expanded together with the airbag body, when folded toward the lower end of the protecting cloth.

4. The knee-protecting airbag device according to claim 2, wherein the upper end part of the protecting cloth is roll-folded in a direction away from the airbag body in a condition that the protecting cloth is flatly expanded together with the airbag body, when folded toward the lower end of the protecting cloth.

5. The knee-protecting airbag device according to claim 2, wherein the upper end part of the protecting cloth is folded in a bellows fashion in a condition that the protecting cloth is flatly expanded together with the airbag body, when folded toward the lower end of the protecting cloth.

6. The knee-protecting airbag device according to claim 1, wherein the retainer cloth is elongate enough to cover up to the upper edge of the airbag body when the airbag body and the retainer cloth are both flatly expanded.

* * * * *